United States Patent
Haechten et al.

(10) Patent No.: US 7,310,696 B1
(45) Date of Patent: Dec. 18, 2007

(54) METHOD AND SYSTEM FOR COORDINATING INTEROPERABILITY BETWEEN DEVICES OF VARYING CAPABILITIES IN A NETWORK

(75) Inventors: John B. Haechten, Buda, TX (US); Stephen G. Dale, Dripping Springs, TX (US); John F. Tyndall, Austin, TX (US)

(73) Assignee: Crossroads Systems, Inc., Austin, TX (US)

( * ) Notice: Subject to any disclaimer, the term of this patent is extended or adjusted under 35 U.S.C. 154(b) by 262 days.

(21) Appl. No.: 11/044,525

(22) Filed: Jan. 27, 2005

Related U.S. Application Data

(60) Provisional application No. 60/633,160, filed on Dec. 3, 2004.

(51) Int. Cl.
- *G06F 13/42* (2006.01)
- *H04L 12/66* (2006.01)
- *H04Q 3/00* (2006.01)
- *G06F 3/00* (2006.01)

(52) U.S. Cl. ............... 710/311; 709/203; 709/227; 710/106; 370/492

(58) Field of Classification Search ............... 710/311, 710/313–315, 46, 106; 709/203, 227, 229, 709/231, 219; 340/825; 370/359, 492, 400–402, 370/466

See application file for complete search history.

(56) References Cited

U.S. PATENT DOCUMENTS

| | | | | |
|---|---|---|---|---|
| 6,104,732 A | * | 8/2000 | Pearman | 370/541 |
| 6,115,376 A | * | 9/2000 | Sherer et al. | 370/389 |
| 6,470,388 B1 | * | 10/2002 | Niemi et al. | 709/224 |
| 6,766,412 B2 | * | 7/2004 | Bolt | 711/111 |
| 6,892,237 B1 | * | 5/2005 | Gai et al. | 709/224 |
| 7,088,706 B2 | * | 8/2006 | Zhang et al. | 370/352 |
| 7,177,917 B2 | * | 2/2007 | Giotta | 709/219 |

OTHER PUBLICATIONS

"A software support infrastructure for wireless access routers" by Zerfos et al. (abstract only) Publication Date: Jun. 2005.*

* cited by examiner

*Primary Examiner*—Gopal C. Ray
(74) *Attorney, Agent, or Firm*—Sprinkle IP Law Group

(57) ABSTRACT

Systems and methods for coordinating the interoperability of devices with varying capabilities are disclosed. A host device may inquire as to the capabilities of a storage device in a storage network. A routing device may receive this response, and if the routing device has a higher capability than the storage device the routing device may convert the response to a response that reflects the higher capabilities of the routing device before sending the response on to the host. However, if the storage device has a higher capability than the routing device, the routing device may pass the response through to the host unaltered so the host may take advantage of the capabilities of the storage device. Alternatively, the router may convert the response to a response that reflects the lower capabilities of the routing device before sending the response on to the host.

17 Claims, 4 Drawing Sheets

*FIG. 2A*

| BIT \ BYTE | 7 | 6 | 5 | 4 | 3 | 2 | 1 | 0 |
|---|---|---|---|---|---|---|---|---|
| 0 | PERIPHERAL QUALIFIER ||| PERIPHERAL DEVICE TYPE ||||| 
| 1 | RMB | 208 | 210 | DEVICE-TYPE MODIFIER |||| 212 |
| 2 | ISO VERSION || ECMA VERSION ||| ANSI-APPROVED VERSION |||
| 3 | AENC | TrmIOP | RESERVED || RESPONSE DATA FORMAT ||||
| 4 | ADDITIONAL LENGTH (n-4) ||||||||
| 5 | RESERVED ||||||||
| 6 | RESERVED ||||||||
| 7 | RelAdr | WBUS32 | WBUS16 | SYNC | LINKED | RESERVED | CmdQue | SftRe |
| 8 ⋮ 15 | (MSB) 204 VENDOR IDENTIFICATION (LSB) ||||||||
| 16 ⋮ 31 | (MSB) PRODUCT IDENTIFICATION (LSB) ||||||||
| 32 ⋮ 35 | (MSB) PRODUCT REVISION LEVEL (LSB) ||||||||
| 36 ⋮ 55 | VENDOR-SPECIFIC ||||||||
| 56 ⋮ 95 | RESERVED ||||||||
| | VENDOR-SPECIFIC PARAMETERS ||||||||
| 96 ⋮ n | VENDOR-SPECIFIC ||||||||

*FIG. 2B*

| BIT \ BYTE | 7 | 6 | 5 | 4 | 3 | 2 | 1 | 0 |
|---|---|---|---|---|---|---|---|---|
| 0 | PERIPHERAL QUALIFIER ||| | PERIPHERAL DEVICE TYPE ||||
| 1 | RMB | 214 RESERVED |||||||
| 2 | 202 VERSION ||||||||
| 3 | AERC | OBSOLETE | NORMACA | HISUP | RESPONSE DATA FORMAT ||||
| 4 | ADDITIONAL LENGTH (n-4) ||||||||
| 5 | SCOS | 206 RESERVED 202 |||||||
| 6 | BQUE | ENCSERV | VS | MULTIP | MCHNGR | OBSOLETE | OBSOLETE | ADDR16† |
| 7 | RelAdr | OBSOLETE | WBUS16† | SYNC† | LINKED | OBSOLETE | CmdQue | VS |
| 8 | (MSB) 202                                                 202 ||||||||
| ⋮ | VENDOR IDENTIFICATION ||||||||
| 15 | (LSB) ||||||||
| 16 | (MSB) ||||||||
| ⋮ | PRODUCT IDENTIFICATION ||||||||
| 31 | (LSB) ||||||||
| 32 | (MSB) ||||||||
| ⋮ | PRODUCT REVISION LEVEL ||||||||
| 35 | (LSB) ||||||||
| 36 | ||||||||
| ⋮ | VENDOR-SPECIFIC ||||||||
| 55 | ||||||||
| 56 | RESERVED |||| CLOCKING† || CAS† | IUS† |
| 57 | RESERVED ||||||||
| 58 | (MSB) ||||||||
| 59 | VERSION DESCRIPTOR 1                                         (LSB) ||||||||
| | ⋮ ||||||||
| 72 | (MSB) ||||||||
| 73 | VERSION DESCRIPTOR 8                                         (LSB) ||||||||
| 74 | ||||||||
| ⋮ | RESERVED ||||||||
| 95 | ||||||||
| | VENDOR-SPECIFIC PARAMETERS ||||||||
| 96 | ||||||||
| ⋮ | VENDOR-SPECIFIC ||||||||
| n | ||||||||
| NOTE:† THE MEANINGS OF THESE FIELDS ARE SPECIFIC TO SPI-3 (SEE 7.3.3). FOR PROTOCOLS OTHER THAN THE SCSI PARALLEL INTERFACE, THESE FIELDS ARE RESERVED. |||||||||

METHOD AND SYSTEM FOR COORDINATING INTEROPERABILITY BETWEEN DEVICES OF VARYING CAPABILITIES IN A NETWORK

RELATED APPLICATIONS

This application claims a benefit of priority under 35 U.S.C. § 119(e) to U.S. Provisional Patent Application No. 60/633,160 by inventors John B. Haechten, Stephen G. Dale, and John F. Tyndall entitled "Method and System for Matching Capabilities in a Storage Network" filed on Dec. 3, 2004, the entire contents of which are hereby expressly incorporated by reference for all purposes.

TECHNICAL FIELD OF THE INVENTION

The invention relates in general to methods and systems for storing and retrieving data, and more particularly, to coordinating interoperability of devices in a storage network with varying capabilities.

BACKGROUND OF THE INVENTION

The small computer system interface ("SCSI") protocol has become a ubiquitous protocol for formatting commands. Versions of the SCSI standard (e.g., SCSI-1, SCSI-2, SCSI-3) define both a command set with defined commands ("SCSI commands") and responses, a data transport protocol (the "SCSI transport protocol") for encapsulating the commands and responses, and a SCSI physical interface. SCSI commands can be encapsulated according to a variety of data transport protocols without using the SCSI data transport protocol or SCSI physical interface. Example data transport protocols include fibre channel, serial storage architecture, serial bus protocol, iSCSI, advanced technology attachment ("ATA"), serial ATA ("SATA"), serial attached SCSI ("SAS") and others. Thus, the SCSI standard separates the SCSI physical interface, SCSI command sets and the SCSI data transport protocol.

As the SCSI standard has evolved, operability issues have arisen between devices that use different versions of the SCSI standard or implement different versions of the SCSI command sets. Legacy devices that support the SCSI-1 or SCSI-2 standard may not support all the commands of the SCSI-3 standard. Additionally, various versions of SCSI primary commands ("SPC") have been developed, such that a device supporting SPC-2 commands may not support SCSI-2 formatted commands. The discrepancy of abilities between the various devices may become problematic, as the capabilities of certain device may lag far behind the capabilities of newer devices.

More particularly, the commands utilized in any chain of devices must be tailored to the capabilities of the intended target, regardless of the capabilities of the target or other devices in communication chain between the initiator and the target. This situation arises as a result of the method by which an initiator determines the ability of a target device.

Typically, before interacting with a target, an initiator sends a SCSI INQUIRY commands to an intended target to determine the capabilities of the target. In response, the target sends an INQUIRY response to the initiator. This INQUIRY response is in the format dictated by the commands set implemented by the target. Thus, an initiator determines the capabilities of a target by evaluating the format of the target's response to the SCSI INQUIRY command.

This methodology, however, does not allow the initiator to take advantage of the capabilities of any intervening devices in the communication chain between the initiator and the target, as the initiator is only aware of the capabilities of the target itself. For example, a router interposed between the initiator and the target, and used to route communications between the initiator and target, may be more capable than the target device. The initiator cannot take advantage of the capabilities of the router, however, as the initiator sends commands based only on the capabilities of the target.

One solution to this problem is to replace the legacy devices. This solution is non-ideal, however, as it is expensive and requires the migration of data to new devices.

Thus, a need exists for a method and system to coordinate the interoperability of device which takes advantage of the resources of the most capable device in the chain of communication.

SUMMARY OF THE INVENTION

Systems and methods for coordinating the interoperability of devices with varying capabilities that send and/or receive commands in a network are disclosed. These systems and methods allow a host or initiator in a storage network to take advantage of the resources of the most capable device in the communication path between the host and a storage/target device. A host device in a storage network may inquire as to the capabilities of a storage device in a storage network. A routing device (e.g., storage router) between the host and the storage device may receive this response, and if the routing device has a higher capability than the storage device the routing device may convert the response to a response that reflects the higher capabilities of the routing device before sending the response on to the host. The host may then interact with the storage device as if the storage device itself had these higher capabilities. However, if the storage device has a higher capability than the routing device, the routing device may pass the response through to the host unaltered so the host may take advantage of the capabilities of the storage device. Alternatively, the router may convert the response to a response that reflects the lower capabilities of the routing device before sending the response on to the host.

One embodiment of the present invention includes receiving a response to an inquiry command from a target which is destined for an initiator at a routing device and wherein formatted according to a first command set. It is determined if the routing device is operable to implement greater functionality than the target and if the routing device is operable to implement greater functionality the response is manipulated to a format according to a second command set implemented by the routing device. The response can then be forwarded to the inquiry.

In another embodiment of the invention, if the routing device is operable to implement less functionality than the target the response is still manipulated to a format according to the second command set implemented by the routing device.

Yet other embodiments of the invention, forward the response unmodified to the initiator if the routing device is operable to implement less functionality than the target.

Yet another embodiment of the present invention can include a routing device comprising, a first controller operable to interface with a first data transport medium, a second controller operable to interface with a second data transport medium, a buffer to provide a memory workspace for the routing device and a processing unit connected to the first controller, the second controller and the buffer, wherein the processing unit can be operable to receive a response to an inquiry command sent from a target and destined for an initiator, wherein the response is formatted according to a first command set, determine if the routing device is operable to implement greater functionality than the target, manipulate the response to a format according to a second command set if the routing device is operable to implement greater functionality, wherein the routing device is operable to implement functionality associated with the second command set, and forward the response to the inquiry.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 2A and 2B are diagrammatic representation of response formats according to various command protocols.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made to the exemplary embodiments of the invention, examples of which are illustrated in the accompanying drawings. Wherever possible, the same reference numbers will be used throughout the drawings to refer to the same or like parts (elements).

Attention is now directed to systems and methods for coordinating the interoperability of devices with varying capabilities that send and/or receive commands in a network (e.g., hosts, storage routers, targets, storage devices and other devices communicating in a storage area network). These systems and methods allow a host or initiator in a storage network to take advantage of the resources of the most capable device in the communication path between the host and a storage/target device. Additionally, these systems and methods may allow storage devices of differing capabilities to appear homogeneous to a host device in the storage network. A host device in a storage network may inquire as to the capabilities of a storage device in a storage network. The format of the response to this inquiry varies according to the capability of the storage device. A routing device (e.g., storage router) between the host and the storage device may intercept this response, and if the routing device has a higher capability than the storage device the routing device may convert the response to a response that reflects the higher capabilities of the routing device before sending the response on to the host. The host may then interact with the storage device as if the storage device itself had these higher capabilities. However, if the storage device has a higher capability than the routing device, the routing device may pass the response through to the host unaltered so the host may take advantage of the capabilities of the storage device. Alternatively, the router may convert the response to a response that reflects the lower capabilities of the routing device before sending the response on to the host.

Figure 1:
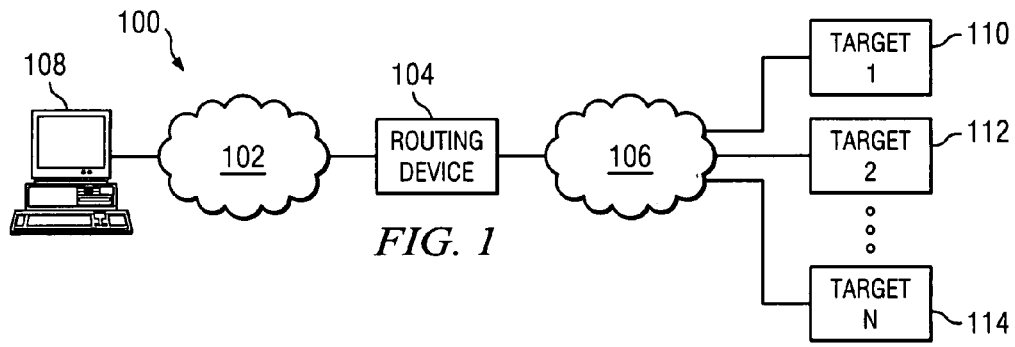
FIG. 1 is a diagrammatic representation of one embodiment of a data communication system according to the present invention.

FIG. 1 is a diagrammatic representation of a system 100 in which embodiments of the present invention can be implemented. Data communication system 100 can be a storage area network ("SAN"), a network attached storage ("NAS") network or other network. Communication system 100 can include a first data transport medium 102, a routing device 104, and a second data transport medium 106. A host 108 (e.g., any device that can initiate a command such as a host computer) connected to routing device 104 by the first data transport medium 102 can send commands to and receive responses from targets 110, 112 (e.g., any device that can receive and process a command such as a storage device, examples of which include hard disk drives, tape drives, worm drives, RAID systems etc.) connected to routing device 104 by second data transport medium 106. While only one initiator and three targets are shown, data communications system 100 can include one or more initiators and one or more targets up to the number of targets (N) supported by routing device 104. First data transport medium 102 and second data transport medium 106 can operate according to any data transport protocol, including SCSI, Fibre Channel, advanced technology attachment ("ATA"), serial ATA ("SATA"), iSCSI, infiniband, parallel SCSI, serial attached SCSI or other data transport protocol known or developed in the art. By way of example, first data transport medium 102 can be a fibre channel transport medium and second data transport medium 106 can be a SCSI data transport medium, such as a SCSI bus.

Continuing with the example in which data transport medium 102 is a fibre channel data transport medium and data transport medium 106 is a SCSI transport medium, routing device 104 can map the initiator/host device to the target(s) 110, 112 according to any address mapping scheme known in the art, including that described in U.S. Pat. No. 6,041,381, entitled "Fibre Channel to SCSI Addressing Method and System," issued Mar. 21, 2000 to Hoese, which is hereby fully incorporated by reference herein and provide access control between host and target devices, such as described in U.S. Pat. No. 5,941,972, entitled "Storage Router and Method for Providing Virtual Local Storage" by Hoese, et al., issued Aug. 24, 1999, U.S. Pat. No. 6,421,753, entitled "Storage Router and Method for Providing Virtual Local Storage" by Hoese, et al., issued Jul. 16, 2002, U.S. Pat. No. 6,425,035, entitled "Storage Router and Method for Providing Virtual Local Storage" by Hoese, et al., issued Jul. 23, 2002, U.S. Pat. No. 6,730,854, entitled "Storage Router and Method for Providing Virtual Local Storage" by Hoese, et al., issued May 18, 2004, U.S. Pat. No. 6,789,752, entitled "Storage Router and Method for Providing Virtual Local Storage" by Hoese, et al., issued Jul. 19, 2004, U.S. Pat. No. 6,763,419 entitled "Storage Router and Method for Providing Virtual Local Storage" by Hoese, et al., issued Sep. 7, 2004, U.S. patent application Ser. No. 10/658,163, filed Sep. 9, 2003, entitled "Storage Router and Method for Providing Virtual Local Storage" by Hoese, et al., each of which is hereby fully incorporated by reference herein.

Routing device 104 can include any network device known in the art, including storage routers, bridges, gateways or other device capable of routing data. Exemplary embodiments of routing devices include the Crossroads 6,000 and 10,000 Storage Routers by Crossroads Systems, Inc., of Austin Tex. Routing device 104 can include a first interface to connect to first data transport network 102 and a second interface to connect to second data transport medium 106. A processing unit can include a processor and a computer readable medium (RAM, ROM, magnetic storage and/or other computer readable medium known in the art) storing a set of computer instructions (the "tracking program"). The processing unit can access memory that provides a memory workspace for the processing unit.

Routing device 104 can receive commands from host 108 and forward these commands along to the intended target 110, 112. The commands can include SCSI commands encapsulated according to a data transport protocol such as a fibre channel protocol or other data transport protocol. The small computer system interface ("SCSI") protocol has become a ubiquitous protocol for formatting commands. Versions of the SCSI standard (e.g., SCSI-1, SCSI-2, SCSI-3) define both a command protocol with a set of defined commands ("SCSI commands") and responses, a data transport protocol (the "SCSI transport protocol") for encapsulating the commands and responses, and a SCSI physical interface. SCSI commands can be encapsulated according to a variety of data transport protocols without using the SCSI data transport protocol or SCSI physical interface. Example data transport protocols include fibre channel, serial storage architecture, serial bus protocol, iSCSI, advanced technology attachment ("ATA"), serial ATA ("SATA"), serial attached SCSI ("SAS") and others. Thus, the SCSI standard separates the SCSI physical interface, SCSI command sets and the SCSI data transport protocol.

Each of the SCSI command sets defines a set of commands for a certain version of the SCSI standard, and the ability to implement these command sets is intrinsically linked with the capabilities and features of a device, as is known in the art. Examples of the command sets include SCSI-2, SPC, SPC-2, SPC-3 etc., with SCSI-2 reflecting a command set providing a relatively lesser degree of functionality, and SPC-3 commands providing a relatively greater degree of functionality. While these command sets are usually backward compatible, issuing an SPC-3 command to a device only capable of implementing the SPC-2 command set can result in an error, or in a worse case scenario a crash of a computing system. To avoid this situation in most cases the capabilities of a device are initially determined before commands are issued to that device.

Using FIG. 1 as an example, suppose host 108 wishes to issue a SCSI command to target 110. To insure that target 110 is capable of handling commands issued by host 108, host 108 may initially send a SCSI INQUIRY command to target 110 to identify the type, make and capabilities of target 110. A target's response to the INQUIRY command contains information about the target device to which the INQUIRY command is directed including information about which command sets of the SCSI standard the target device supports. The response formats for the various supported command sets, however, are different from one another. Therefore, the format of the response to the SCSI INQUIRY command issued by host 108 reflects the capabilities of target 110. For example, if target 110 is capable of implementing SPC-2 the format of the response to host 108 will reflect this. Based on the format of the response from target 110, host 108 can then issue commands to target 110 commensurate with the capabilities of 110.

However, in many cases, routing device 104 may also have the capability to implement a set of commands. Usually, the capabilities of routing device 104 and targets 110, 112 do not match exactly. In some cases, the capability of routing device 104 may exceed the capabilities of one or more of targets 110, 112 coupled to routing device 104. In this case it may be advantageous to utilize the capabilities of the router to reduce the workload of host 108. In other cases, the capability of routing device 104 may be less than one or more of targets 110, 112. In these cases, there is a risk that host 108 may issue a SCSI command which cannot be supported by router 104. Typically, however, because routing device 104 simply forwarded the response of targets 110, 112 to SCSI INQUIRY commands directly to host 108; host 108 remained unaware of the capabilities of router 104 located between host 108 and targets 110, 112.

This situation may be ameliorated by intercepting a target's response to a SCSI INQUIRY command at a routing device and, based on the capabilities of the router and the target, manipulating the response to reflect the capabilities of the routing device before returning the response to the host, or alternatively, passing the response to the host unaltered.

Routing device 104 can include computer executable instructions to maintain a knowledgebase of command set formats used by devices (e.g., initiators and targets) that communicate data through routing device 104. For example, routing device can maintain a knowledgebase of various mappings between formats of command sets. The knowledgebase can include a knowledgebase of mappings between different formats of responses to SCSI INQUIRY commands or simply a mapping of incompatibilities between responses in different formats. For incompatibilities, knowledgebase can specify conversions between the responses in the various formats. By way of example, but not limitation, the knowledge base can include mappings between responses to the SCSI INQUIRY command in SCSI-1 and SCSI-2, SCSI-1 and SCSI-3, SCSI-2 and SCSI-3, SCSI-1 and SPC-1, SCSI-1 and SPC-2, SCSI-2 and SPC-1, SCSI-2 and SPC-2, SCSI-3 and SPC-1, SCSI-3 and SPC-2, and SPC-1 and SPC-2. Additional mappings can be implemented as new command protocols, such as SPC-3, are deployed.

Turning briefly to FIGS. 2A and 2B, FIG. 2A is a diagrammatic representation of a response format to an INQUIRY command according to the SCSI-2 standard and FIG. 2B is a diagrammatic representation of a response format to an INQUIRY command according to the newer SPC-2 standard. As can be seen from these FIGURES, the response formats between the SPC-2 and SCSI-2 command sets vary. Several fields specified in the SCSI-2 standard are obsolete in the SPC-2 standard, as illustrated in FIG. 2B by obsolete fields 202 of FIG. 2B). For example, SPC-2 no longer specifies a WBus32 field 204 (FIG. 2A). Additionally, as shown in FIG. 2B, the SPC-2 standard has added some fields that were not specified in the SCSI-2 standard, such as multi-port field 206 ("MultiP"). Additionally, other fields from the SCSI-2 response format have been merged or otherwise changed. For example, ISO version field 208, ECMA version field 210 and ANSI-approved field 212 of the SCSI-2 response format (FIG. 2A) have been merged into version field 214 of the SPC-2 response format (FIG. 2B).

Returning to FIG. 1, assume that router 104 supports the SPC-2 command set, target 110 supports the SCSI-2 command set, and target 112 supports the SPC-3 command set. Now suppose that initiator 108 sends an INQUIRY command intended for target 110 to router 104. Routing device 104 can receive the INQUIRY command and pass the command unchanged to target 110. In this case, while the command itself may be unchanged, the encapsulation data transport protocol for the command (e.g., fibre channel, SCSI data transport protocol, SATA, ATA or other data transport protocol) can change, as would be the case in which routing device 104 is a fibre channel-to-SCSI router.

In response to the command, target 110 can send an INQUIRY response. Since the highest level functionality supported by target 110 is SCSI-2, the format of the INQUIRY response sent by target 110 is SCSI-2. Upon receiving the INQUIRY response from target 110 in SCSI-2 format, router 104 may determine that router 104 can support the SPC-2 command set, a greater degree of functionality than SCSI-2. Routing device 104 can then modify the INQUIRY response sent by target 110 in accordance with the SPC-2 format for an INQUIRY response. Routing device 104 can, for example, change the version field to SPC-2 and set the MultiP bit. Routing device 104 can further eliminate obsolete data from the response and supply data for capabilities supported by SPC-2 but not SCSI-2. Routing device 104 can also supply error indications for capabilities supported by SPC-2 but not SCSI-2.

Suppose, furthermore, that initiator 108 sends an INQUIRY command intended for target 112 to router 104. Routing device 104 can receive the INQUIRY command and pass the command unchanged to target 112. In response to the command, target 112 can send an INQUIRY response. Since the highest level functionality supported by target 112 is SPC-3, the format of the INQUIRY response sent by target 112 is SPC-3. Upon receiving the INQUIRY response from target 112 in SPC-3 format, router 104 may determine that router 104 can only support the SPC-2 command set, a lesser degree of functionality than SPC-3. Routing device 104 can then modify the INQUIRY response sent by target 112 in accordance with the SPC-2 format for an INQUIRY response. Alternatively, routing device 104 may pass the INQUIRY response sent by target 112 to host 108 unchanged.

In one embodiment, whether routing device 104 passes the INQUIRY response from target 112 to host 108 unchanged, or converts the INQUIRY response to the SPC-2 format depends on the functionality of routing device 104. If routing device 104 is capable of implementing any functionality it may be required to perform with respect to the SPC-3 command set, routing device 104 may pass the INQUIRY response from target 112 to host 112 without alteration. If, however, routing device 104 lacks the capability to function as may be required from an SPC-3 command, routing device 104 may modify the INQUIRY response sent by target 112 in accordance with the SPC-2 format for an INQUIRY response before sending the response to host 108.

A routing device can thus receive an INQUIRY response command from a target, where the INQUIRY response was generated in a first format corresponding to a first command set and compare the capabilities represented by the format of the INQUIRY response with the capabilities of the routing device. If the routing device is more capable than the target, the routing device may convert the INQUIRY response to the format of a second command set implemented by the routing device before passing the INQUIRY response to a host. However, if the routing device is less capable than the target, the routing device may convert the INQUIRY response to the format of the second command set implemented by the routing device before passing the INQUIRY response to the host or, alternatively, may pass the INQUIRY response to the host unchanged.

Figure 3A:
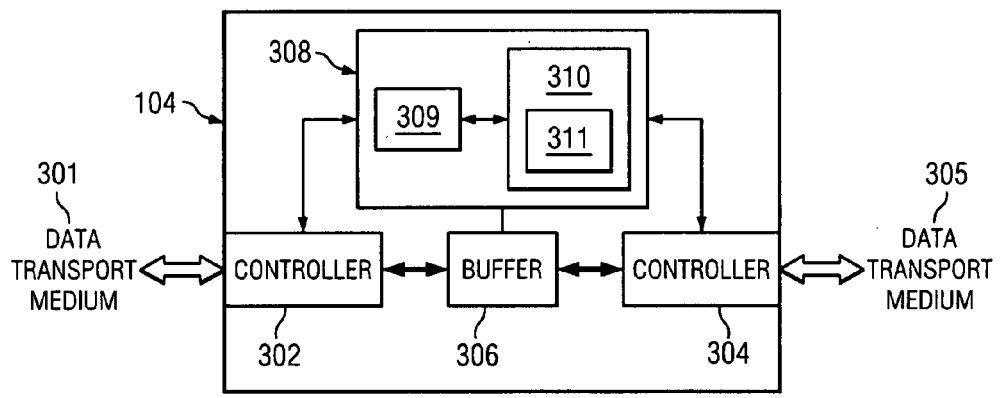
FIG. 3A is a diagrammatic representation of one embodiment of a routing device and FIG. 3B is a diagrammatic representation of one embodiment of a data flow in the example routing device of FIG. 3A.

FIG. 3A is a diagrammatic representation of one embodiment of a routing device 104 in which command processing according to embodiments of the present invention can be implemented. The routing device can comprise a first transport medium controller 302 that interfaces with a first transport medium 301 and a second transport medium controller 304 that interfaces with a second transport medium 305. In one embodiment of the present invention, the first transport medium 301 can be a Fibre Channel transport medium, the second data transport medium 305 a SCSI bus, controller 302 a Fibre Channel controller, such as a fibre channel controller based on the TACHYON family of fibre channel control chips and controller 304 a SCSI controller. TACHYON fibre channel control chips are a product of Agilent Technologies, Inc. of Palo Alto, Calif. Various forms of the Tachyon fibre channel control chip can be used including, but not limited to, the TL or Tachlite (HPFC-5100), the XL2 (HPFC-5200x, where x is the Rev A, B, C, etc.), the DX2 (HPFC-5400x, where x is the Rev A, B, C, etc.), the DX4 (HPFC-5700x, where x is the Rev A, B, C, etc.).

In other embodiments of the present invention, the first and second transport media (and respective controllers) can be: Fibre Channel and Fibre Channel; SCSI and SCSI; iSCSI and iSCSI; Fibre Channel and iSCSI; iSCSI and Fibre Channel; iSCSI and SCSI; SCSI and iSCSI; Fibre Channel and Infiniband; Infiniband and Fibre Channel; iSCSI and ATA; ATA and iSCSI; iSCSI and SATA; Serial ATA and iSCSI; Fibre Channel and Serial Attached SCSI; Serial Attached SCSI and Fibre Channel; iSCSI and Serial Attached SCSI; Serial Attached SCSI and iSCSI; Fibre Channel and ATA; ATA and Fibre Channel; Fibre Channel and SATA; SATA and Fibre Channel; Fibre Channel and Serial SCSI Architecture; Serial SCSI Architecture and Fibre Channel; Infiniband and Serial Attached SCSI; Serial Attached SCSI and Infiniband. Moreover, the transport media can operate according to other protocols. Additionally, the various transport media can carry commands according to a variety of command sets including, but not limited to, SCSI-1, SCSI-2, SCSI-3, SPC-1, SPC-2 and SPC-3.

A buffer 306 provides memory work space and is connected to both controller 302 and to controller 304. A processing unit 308 is connected to controller 302, controller 304 and buffer 306. According to one embodiment of the present invention, processing unit 308 comprises one or more processors 309 for controlling operation of the storage router, handling address mapping and security access and converting commands between protocols and a computer readable medium 310 accessible by the processor storing a set of computer instructions 311 that are executable by the processor. According to other embodiments of the present invention buffer 306 and/or computer readable medium 311 can be onboard processor 310.

In one implementation (not shown), the storage router can be a rack mount or free standing device with an internal power supply. The routing device can have a Fibre Channel and SCSI port, and a standard, detachable power cord can be used, the FC connector can be an optical Small Form Factor ("SFF") connector, and the SCSI connector can be a VHDCI type. Additional modular jacks can be provided for a serial port and an 802.3 10BaseT port, i.e. twisted pair Ethernet, for management access. The SCSI port of the storage router can support SCSI direct and sequential access target devices and can support SCSI initiators, as well. The Fibre Channel port can interface to SCSI-3 FCP enabled devices and initiators or other Fibre Channel devices.

To accomplish its functionality, one implementation of the routing device uses: a Fibre Channel interface based on the Agilent XL2 2 Gb/s Fibre Channel controller and an optical SFF transceiver; a PMCS RM7000A processor, incorporating independent data and program memory spaces, and associated logic required to implement a stand alone processing system; and a serial port for debug and system configuration. Further, this implementation includes a SCSI interface supporting Ultra-2 based on the SYMBIOS 53C8xx series SCSI controllers, and an operating system based upon the WIND RIVERS SYSTEMS VXWORKS kernel. In addition, the routing device can include software as required to control functions of the various elements, convert commands and responses between command protocols and generate commands and provide appropriate translations between the FC and SCSI data transport protocols.

Figure 3B:
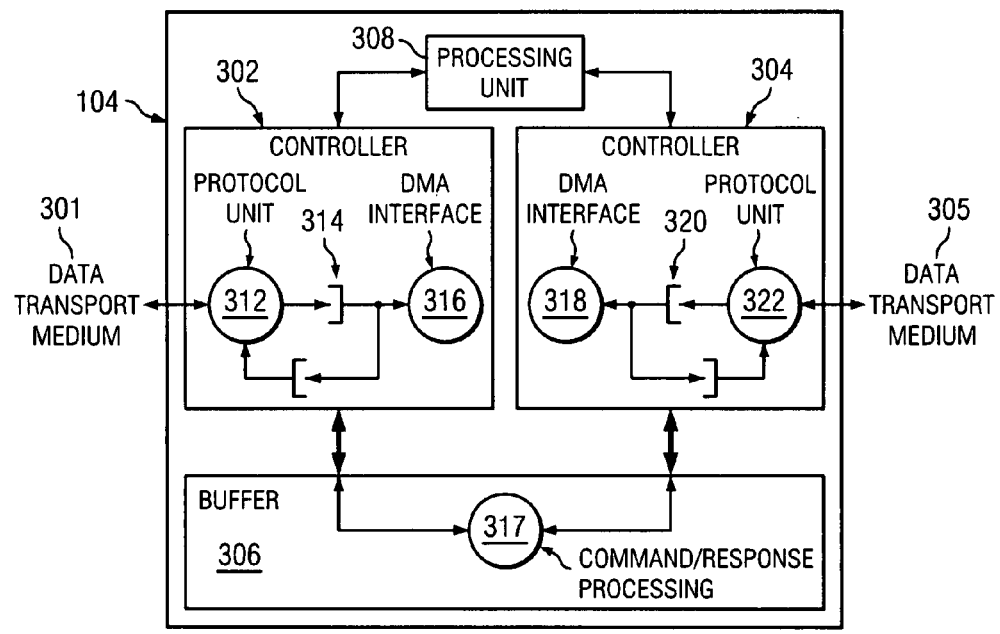

FIG. 3B is a block diagram of one embodiment of data flow within the storage router of FIG. 3A. As shown, data from the first transport medium 301 (e.g., the Fibre Channel transport medium) is processed by a protocol unit 312 (e.g., a Fibre Channel protocol unit) and placed in a FIFO queue 314. A direct memory access (DMA) interface 316 then takes data out of FIFO queue 314 and places it in buffer 306.

Processing unit 308 processes the data in buffer 306 as represented by supervisor processing 317. This processing can include mapping between the first data transport protocol and the second data transport protocol, mapping between command protocols and applying access controls and routing functions. A DMA interface 318 then pulls data from buffer 306 and places it into a buffer 320. A second protocol unit 322 pulls data from buffer 320 and communicates the data on the second transport medium (e.g., the SCSI bus). Data flow in the reverse direction, from the second data transport medium to the first data transport medium, can be accomplished in a reverse manner.

In one embodiment, processing unit 308 can be operable to maintain a knowledgebase of incompatibilities between formats of INQUIRY responses corresponding to different command sets. The knowledge base can be stored as a database, lookup table or any other suitable programming format. Based on the knowledgebase, processing unit 310 can determine the command set format of an INQURY response sent from a storage device and if that command set represents a greater degree of functionality than is implemented in the routing device. If the routing device is more capable than the target, processing unit 310 may convert the INQUIRY response to the format of a command set reflecting the capability of routing device 104 before passing the INQUIRY response to a host. However, if the command set format represents a greater functionality than is implemented in routing device 104, processing unit may convert the INQUIRY response to the format of the command set implemented in routing device 104 before passing the INQUIRY response to the host or, alternatively, may pass the INQUIRY response to the host unchanged.

It should be noted that the example of the routing device of FIGS. 3A and 3B is provided by way of example. Embodiments of the present invention can be implemented in routing devices such as routers, bridges, hubs or other routing devices. Additionally, embodiments of the present invention can be implemented as hardware and/or software programming. Embodiments can be implemented as computer instructions stored on any computer readable medium known in the art (e.g., optical disk, magnetic disk, flash memory, RAM, ROM, EEPROM or other computer readable medium).

Figure 4:
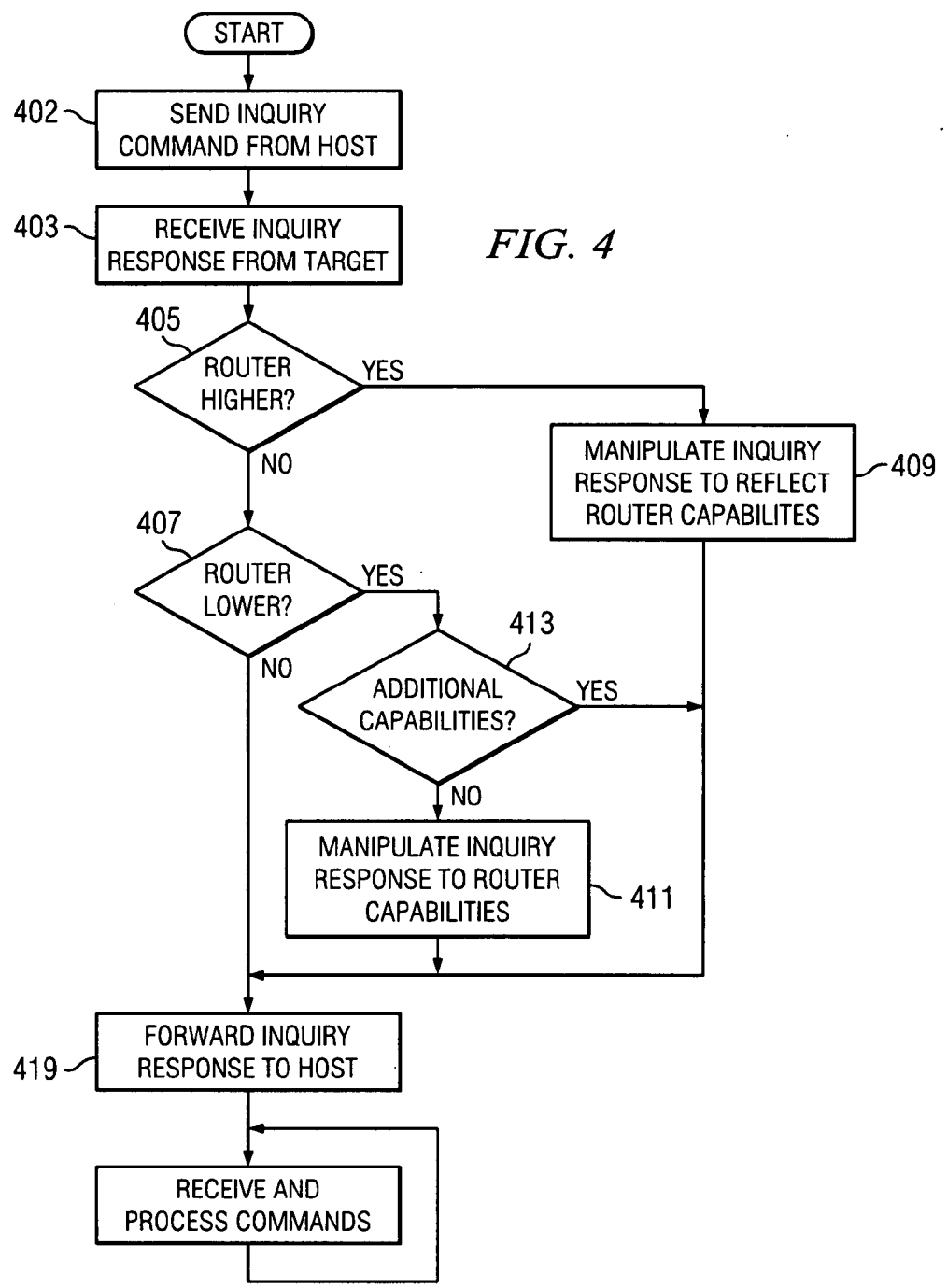
FIG. 4 is a flow chart illustrating one embodiment of a method for processing commands and responses.

Moving now to FIG. 4, one embodiment of a method for processing commands and responses is illustrated. A host device, at step 402, can establish the command sets supported by devices with which it communicates (e.g., initiators and targets). This can be done, for example, by sending a SCSI INQUIRY command to a target device during a discovery phase. In response to the INQUIRY command, the target device will typically return a response to the INQUIRY command in a command protocol corresponding to the command set that that device supports. For example, a device, such as a tape library, may return a response in the SCSI-2 command protocol, whereas a disk array may return a response in the SPC-2 command protocol.

At step 403, the routing device can receive the INQUIRY response from the target device. This INQUIRY response from a target is usually in a format reflecting the capabilities of the target device. For example, if the target device can provide the functionality required by the SPC-2 command set, the INQUIRY response will be in the SPC-2 format. Similarly, if the target can only implement the functionality of the SCSI-2 command set, the format of the INQUIRY response will be SCSI-2.

The routing device, at steps 405 and 407, can determine whether the target device from which it received the INQUIRY response is more capable than the routing device or less capable than the target device. This may be done by comparing the command set represented by the format of the INQUIRY response received from the target (step 403) with the capabilities of the router.

If the router is more capable than the target device (YES branch of step 405), the routing device can manipulate the INQUIRY response to reflect the greater capability of the routing device (step 409) before sending the INQUIRY response on to the host device (step 419). This manipulation may include mapping the format of the received INQUIRY response to a format for an INQUIRY response that reflects the capabilities of the routing device, as discussed above.

If the router is less capable than the target device (YES branch of step 407), the routing device then determines, at step 413, if the routing device can support the additional functionality required of it in the command set represented by the format of the INQUIRY response received from the storage device. If the router can implement this functionality (YES branch of step 413), the routing device can send the INQUIRY response on to the host device (step 419) unaltered.

If, however, the routing device cannot implement this additional functionality (NO branch of step 413) the routing device can manipulate the INQUIRY response to reflect the lesser capability of the routing device (step 411) before sending the INQUIRY response on to the host device (step 419). This manipulation may include mapping the format of the received INQUIRY response to a format for an INQUIRY response that reflects the capabilities of the routing device, as discussed above.

From that point on, when the host sends a command to that target, that command may be in the command set reflected by the INQUIRY response sent from the routing device to the initiating host (step 419). This command may be received, at step 421, by the routing device which will process the command to determine if the router should respond to the command or should modify the command before passing the command through to the intended target. U.S. patent application Ser. No. 11/004,297, entitled "System and Method for Processing Commands" by John Tyndall and Gao Lin, filed Dec. 3, 2004.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for coordinating interoperability of devices, comprising:
   receiving a response to an inquiry command from a target and destined for an initiator at a routing device, wherein the response is formatted according to a first command set;
   determining if the routing device is operable to implement greater functionality than the target;
   manipulating the response to a format according to a second command set if the routing device is operable to implement greater functionality, wherein the routing device is operable to implement functionality associated with the second command set; and
   forwarding the response to the inquiry to the initiator.

2. The method of claim 1, determining if the routing device is operable to implement less functionality than the target.

3. The method of claim 2, further comprising manipulating the response to a format according to the second command set, if the routing device is operable to implement less functionality than the target.

4. The method of claim 2, further comprising forwarding the response unmodified to the initiator if the routing device is operable to implement less functionality than the target.

5. The method of claim 4, further comprising determining if the router is operable to implement functionality associated with the first command set.

6. The method of claim 2, wherein determining if the routing device is operable to implement greater functionality than the target further comprises determining if the second command set is more functional than the first command set; and
   determining if the routing device is operable to implement less functionality than the target further comprises determining if the second command set is less functional than the first commands set.

7. The method of claim 1, wherein the response is manipulated based on a knowledgebase mapping the format of the first command set to the format of the second command set.

8. The method of claim 7, wherein the inquiry is a SCSI INQUIRY.

9. A computer program product comprising a set of computer instructions stored on a computer readable medium, wherein the set of computer instructions comprise instructions executable for:
   receiving a response to an inquiry command from a target and destined for an initiator at a routing device, wherein the response is formatted according to a first command set;
   determining if the routing device is operable to implement greater functionality than the target;
   manipulating the response to a format according to a second command set if the routing device is operable to implement greater functionality, wherein the routing device is operable to implement functionality associated with the second command set; and
   forwarding the response to the inquiry to the initiator.

10. The computer program product of claim 9, wherein the instructions are further executable for determining if the routing device is operable to implement less functionality than the target.

11. The computer program product of claim 10, wherein the instructions are further executable for manipulating the response to a format according to the second command set, if the routing device is operable to implement less functionality than the target.

12. The computer program product of claim 10, wherein the instructions are further executable for forwarding the response unmodified to the initiator if the routing device is operable to implement less functionality than the target.

13. The computer program product of claim 12, wherein the instructions are further executable for determining if the routing device is operable to implement functionality associated with the first command set.

14. The computer program product of claim 10, wherein determining if the routing device is operable to implement greater functionality than the target further comprises determining if the second command set is more functional than the first command set; and
   determining if the routing device is operable to implement less functionality than the target further comprises determining if the second command set is less functional than the first commands set.

15. The computer program product of claim 9, wherein the response is manipulated based on a knowledgebase mapping the format of the first command set to the format of the second command set.

16. The computer program product of claim 15, wherein the inquiry is a SCSI INQUIRY.

17. A method for coordinating interoperability of devices, comprising:
   receiving at a routing device a response to a SCSI INQUIRY from a target and destined for an initiator, wherein the response is formatted according to a first command set implemented by the target;

determining if the routing device is operable to implement greater functionality or lesser functionality than the target;

manipulating the response to a format according to a second command set if the routing device is operable to implement greater functionality or lesser functionality than the target, wherein the routing device is operable to implement functionality associated with the second command set; and forwarding the response to the SCSI INQUIRY to the initiator.

* * * * *